United States Patent

Habay et al.

Patent Number: 5,450,887
Date of Patent: Sep. 19, 1995

[54] SUPPORT DEVICE FOR A TIRE TREAD

[75] Inventors: Emmanuel Habay; Guy-Noël Lambert, both of Clermont-Ferrand, France

[73] Assignee: Compagnie Générle des Etablissements Michelin-Michelin & Cie, Clermont-Ferrand Cedex, France

[21] Appl. No.: 275,292

[22] Filed: Jul. 14, 1994

[30] Foreign Application Priority Data

Jul. 19, 1993 [FR] France .................. 93 08932

[51] Int. Cl.$^6$ .............................. B60C 17/04
[52] U.S. Cl. ...................... 152/520; 152/521
[58] Field of Search ........... 152/520, 158, 513, 516, 152/323, 531

[56] References Cited

U.S. PATENT DOCUMENTS

| | | |
|---|---|---|
| Re. 32,693 | 6/1988 | Winfield . |
| 2,989,108 | 6/1961 | Gore .................. 152/158 |
| 4,137,894 | 2/1979 | Gardner et al. ............ 152/520 X |
| 4,258,767 | 3/1981 | Wilde .................. 152/520 X |
| 4,327,791 | 5/1982 | Strader ................. 152/520 X |

FOREIGN PATENT DOCUMENTS

| | | |
|---|---|---|
| 0159274 | 10/1985 | European Pat. Off. . |
| 1480805 | 1/1969 | Germany . |
| 3501116 | 7/1986 | Germany ............ 152/520 |
| 3505832 | 8/1986 | Germany ............ 152/520 |
| 3614473 | 11/1987 | Germany ............ 152/520 |
| 3703446 | 8/1988 | Germany ............ 152/516 |
| 3720706 | 1/1989 | Germany ............ 152/520 |

OTHER PUBLICATIONS

Patent Abstracts of Japan, vol. 8, No. 28 (M-274) 7 Feb. 1984 & JP-A-58185305 (Sumitomo Rubber Ind. Ltd.) 29 Oct. 1983.

*Primary Examiner*—Michael W. Ball
*Assistant Examiner*—David W. Reed
*Attorney, Agent, or Firm*—Brumbaugh, Graves, Donohue & Raymond

[57] ABSTRACT

Support device S for the tread of a tire P, comprising a rigid support (1), an elastic cap (2) of rubber stock, a layer of lubricant (5) being arranged between said support (1) and said cap (2) to permit circumferential displacement of one with respect to the other, means (21, 23, 12, 121, 122, 125) being provided to assure the holding of the cap (2) transversely and radially on the support (1).

12 Claims, 2 Drawing Sheets

SUPPORT DEVICE FOR A TIRE TREAD

BACKGROUND OF THE INVENTION

The present invention relates to a tire tread support device, said device being used in the event of the travel of the tire under an inflation pressure of zero or low value. The use of such a device, also known as safety device, mounted within the tire is to permit an equipped and loaded vehicle to continue to travel despite the partial or total loss of inflation pressure, the continuity of travel being beneficial for various obvious reasons.

Metal safety devices are widely known. In the event of the use of such devices in combination with tires intended for and capable of traveling on various soils, comprising, in particular, stones, rocks or various agglomerates, said devices do not withstand impacts well and are fragile, their rupture leading rapidly to the complete destruction of the tire.

There are also known safety devices which are made of rubbery elastic material, that is to say of a vulcanized mix composed of natural or synthetic rubber, reinforced by known reinforcement agents in the presence of the necessary additives. These devices are entirely suitable for supporting a small load, for instance in the case of tires of a passenger vehicle. On the other hand, in the case of tires which support heavy loads, the weight and the hardness properties of the vulcanized mix which are necessary to support the load with a reasonable yielding of the tire are such that the travel of the assembly results rapidly and prematurely in a heating which is not compatible with the life of the tire.

European Patent 0 130 136 describes a safety device formed of two different materials: the radially inner part or support of said device, which is rigid, is made with any rigid material, in particular a reinforced plastic or metallic material, and the radially outer part or cap, which is not rigid, is formed of any vulcanized elastomer. These two parts, namely support and cap, are connected together firmly in such a manner that they are made incapable of any relative movement with respect to each other.

The device described is likewise made integral with the mounting rim, a lubricant being employed in order to lubricate the interface, in the case of travel under low or zero pressure, between the radially outer face of the cap and the radially inner face of the crown of the tire. The cross-sectional height of the device can be between 25 and 55% of the height of the tire, seen in meridian section. As to the cross-sectional height of the support, it may be between 20% and 80% of the height of the device.

As the safety devices are frequently used on vehicles which have a "centralized" inflation system, that is to say a system which permits the inflating of the tires while traveling, the lubricant, which is arranged on the cap and is dispersed under the effect of the rubbing and heat, can easily discharge through the inflation conduits and clog them. Furthermore, the presence of the lubricant does not do away with the coefficient of rubber-on-rubber friction and the friction is still substantial.

It is also known that it is possible and preferable that the safety device to be able to turn around the rim so as to permit compensation for the difference in circumference between the inside of the crown of the tire and the radially outer face of the device. This is taught in U.S. Pat. No. 3,635,273 in which the means described to permit the rotation of the device around the rim concern the interface between the rim and the said device. In the case of a substantial transverse force suffered by the tire traveling under small or no pressure, such force is transmitted almost entirely to the rim-device interface, that is to say, to the level of the said means, which makes them as well as the interface fragile. They then rapidly lose their effectiveness.

In GB 2 084 088, the safety device comprises a rigid support, which is fixed with respect to the rim, over which radially on the outside, there is an elastic belt of rectangular section which is movable with respect to the rigid support and partially engaged in a circumferential groove developed on the outer face of said support; the side faces of this recess serve as stops for the axial displacements of the belt. This device has the drawback that the side edges of the rigid support can come into contact with the walls of the tire.

SUMMARY OF THE INVENTION

In order to remedy the drawbacks described while having a safety device formed of two materials, the device in accordance with the invention, which comprises at least one rigid support, the radially outer part of which forms a bearing ring, and an elastic cap of vulcanized rubber mix, the thickness of which is at least equal to 50% of the thickness or total height of the device, said cap surrounding the bearing ring, and a lubricating product being arranged between the ring and the cap in order to permit the displacement of the cap with respect to the support, is characterized by the fact that the maximum axial width of the elastic cap is greater than that of the maximum axial width of the bearing ring, which corresponds to the maximum axial width of the support;

the shape of the radially outer face of the bearing ring of the support cooperates with reinforcement elements arranged in the cap in order to assure the radial holding and circumferential guiding of the said cap on the support, the device being provided with means to assure the holding thereof on the tire mounting rim equipped with the said device.

The lubricating product which permits the circumferential displacement of the cap with respect to the support may be present in paste or solid form.

A lubricant in paste form, such as generally employed in order to permit the mounting of tire beads on rim seats, will advantageously be used.

The reinforcement elements of the cap are preferably at least one or several wires. It is advantageous to add to said wire or wires a reinforcement armature formed of one or more plies of metal and/or textile cords or cables oriented at angles of between 0° and 90° with respect to the circumferential direction of the device.

Preferably, as known per se, the rigid support of the safety device is a support consisting of three curved parts which are assembled in the tire along their machined meridian faces.

The radially outer edges of the said faces will also advantageously be rounded, so as to avoid injuries to the inner face of the non-rigid cap after rupture of the layer of lubricant.

In order to permit the obtaining of a sag of the device under load which conforms as much as possible with the deformation of the tire, the tread of the cap is advantageously provided with at least two circumferential linear or zig-zag grooves.

The base of the support, once assembled, can be firmly attached to the mounting rim by any known fastening means, said means, however, providing for the possibility of the subsequent removal of the support. Preferably, the support will be connected to the rim elastically by means of an annular part or elastic ring of vulcanized rubber mix comprising, seen in meridian section, a substantially rectangular base over which radially on its edges there are two lateral ribs intended to assure contact with the axially inner faces of the beads of the tire.

The characteristics and advantages of the invention will be better understood from the following description, read with reference of the drawing, which shows several embodiments by way of illustration and not of limitation.

DESCRIPTION OF PREFERRED EMBODIMENTS

Figure 1:
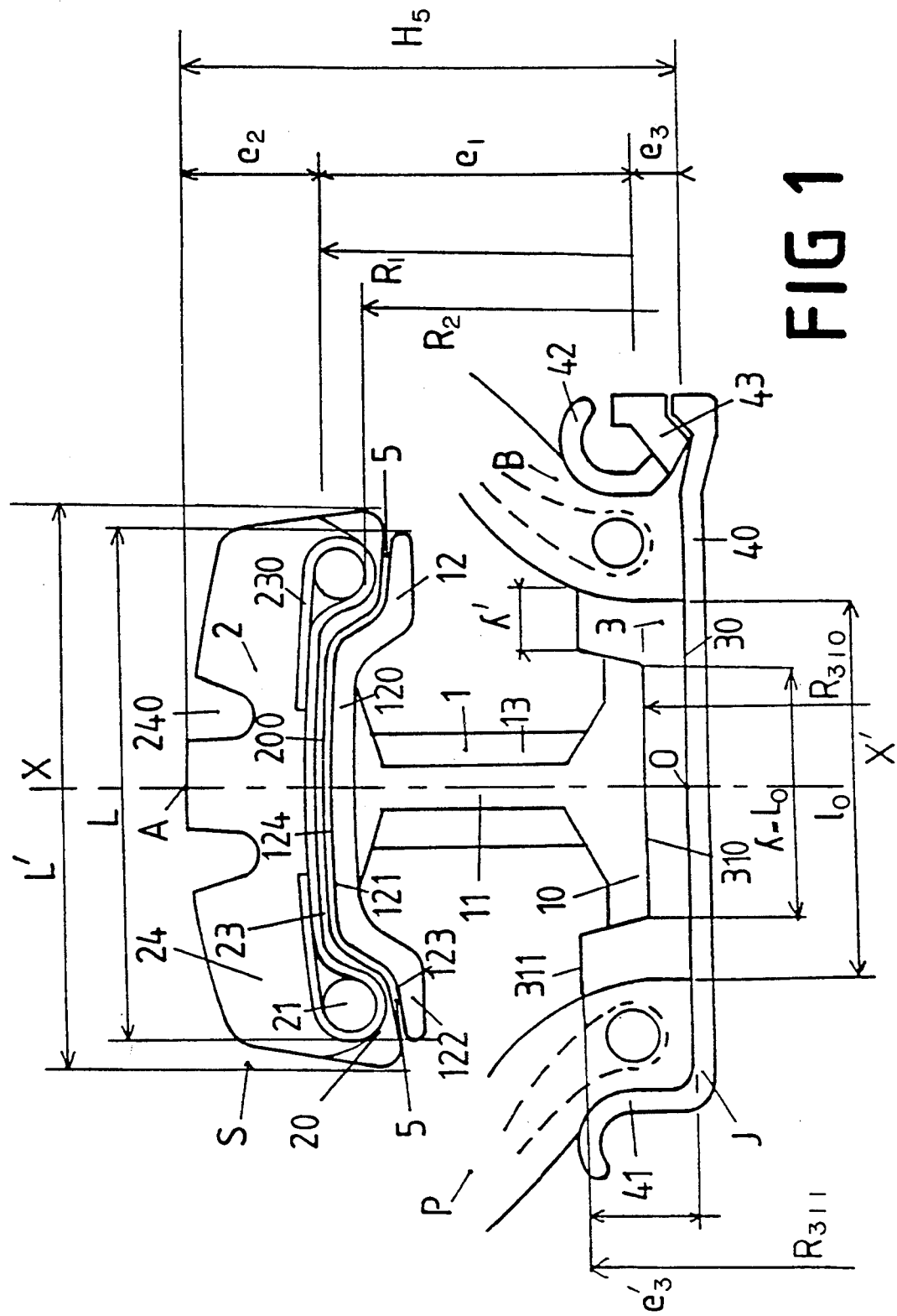
FIG. 1 shows, diagrammatically in meridian section, a first variant of the device in accordance with the invention.

The safety device S shown in FIG. 1 and intended to be mounted within the tire P of size 14-00 20 X is formed of three parts, namely a metallic rigid support 1, a non-rigid elastic cap 2 intended to come into contact with the inner face of the crown of the tire, and an annular part 3 for connection with the rim J on which the tire P is mounted. The said rim J is an ordinary disassemblable rim, that is to say formed of three pieces, namely the rim bottom 40 which is flat and connected to a non movable rim flange 41, the movable second rim flange 42, and the locking ring 43.

The rigid support 1 is a support of aluminum alloy. Seen in meridian section, it is formed of a base 10 radially over which there is a disk 11 on top of which, in turn, there is the bearing ring 12 which is intended to receive the layer of lubricant 5 of the cap 2 on its radially outer face.

This bearing ring 12 has a transverse shape similar to the shape of a rim but inverted, that is to say with a mid-portion of the ring 120 further from the axis of rotation of the device than the tops of the ring shoulders 122. The mid-portion of the ring 120 has a slightly convex, radially outer face 121, that is to say its center of curvature is located on the trace XX' of the equatorial plane of the device and radially to the inside. As to the shoulders 122, their radially outer faces 123 are substantially linear and parallel to the axis of rotation. The distance between the point of the radially outer face 121 of the ring mid-portion 120 furthest from the axis of rotation of the line joining the radially outer faces 123 of the shoulders 122 is equal to 22 mm, and generally at least equal to 0.25 times the thickness $e_2$ of the cap 2. This thickness $e_2$ of the cap 2 is defined as being the difference between the radii of two cylinders of the same axis as the axis of the rim J and one of which has as its generatrix an imaginary straight line passing through the point of the bearing ring 12 furthest radially to the outside and the other has as its generatrix a line passing through the point of the cap 2 furthest from the axis of rotation.

Circumferentially, the support 1 is formed of three curved parts which are assembled by the meridian faces of the flanges 13 which reinforce the disk 11. These flanges 13 are, in the case described, pierced by orifices (not shown) so as to receive the suitable fastening means. These meridian faces are wider axially than the disk 11 but not as wide as the bearing ring 12 or the base 10 of the support 1.

The non-rigid, elastic cap 2 is disposed radially to the outside of the outside rigid support 1 on the outer face of the bearing ring 12 which is covered with a layer of paste lubricant 5.

This cap 2 is in the form a closed circular ring and, seen in meridian section, it has a radially inner face 200 which geometrically follows the meridian profile of the radially outer face 124 of the bearing ring 12 but is at a constant distance from said face 124 by an amount equal to 1 mm, so as to provide maximum effectiveness of the lubricant 5. The cap 2 comprises, radially on the inside, a layer 20 of vulcanized mix having a small coefficient of friction with aluminum while being of great mechanical strength so as to be able to withstand surface imperfections of the support 1 and any foreign bodies which might possibly enter between said support 1 and the cap 2. If L is the maximum axial width of the bearing ring 12 of the support 1, the maximum axial width L' of the cap 2 is located at the level of the base of said cap and its value is greater than L in order to avoid possible contact between tire and support 1. In the example described, L' is equal to 170 mm, while L is equal to 150 mm.

Symmetrically with respect to the equatorial plane XX' of the device, there is arranged, in each lower edge of the cap 2, a wire 21 the inner radius $R_2$ of which is less than the maximum outer radius $R_1$ of the bearing ring 12 of the support 1. The wires 21, which are coated with rubber mix, are the anchoring wires of a reinforcement armature 23, said armature being turned up towards the outside on said wires 21 in order to form turn-ups 230.

The wires 21 are wires of "braided" type but without central core, which permits good resistance to tensile stresses while permitting sufficient ovalization for the easy introduction of the cap 2, reinforced in this manner, into the tire P.

The reinforcement armature 23 is formed of a single ply of metal cables of steel. On top of this armature radially to the outside there is a tread 24 of vulcanized rubber mix which is characterized by having a low hysteresis loss so as to minimize the generation of heat.

This tread 24 is provided with circumferential grooves 240, two in the example described, which grooves, in combination with the convexity of the radially outer face of the tread 24, permits the tread to deform and follow the meridian profile of the inside of the crown of the tire P traveling under little or no pressure.

As to the solid annular part 3 of rubber stock, it has a radially inner face 30 which, seen in meridian section and not mounted on the rim, is flat and has a width 1 slightly greater than the theoretical axial width lo which separates the axially inner faces of the two beads B, measured at the level of the rim J, this feature permitting, upon the putting of the device in place on the rim J with the tire P, a slight compression in axial direction. As to the radially outer face of the ring 3, it comprises a central portion 310 of axial width λ equal to the axial width of the base Lo of the support 1 and of radius $R_{310}$ such that the central thickness $e_3$ of the ring 3, measured in the equatorial plane, is equal to 23 mm and, on both sides, two lateral portions or ribs 311 each of axial width λ' equal to 0.2 λ and of radius $R_{311}$ such that the thickness $e'_3$ of the lateral portions 311 of the ring 3 is greater than the thickness $e_3$ by 10 mm. The lateral faces of the ring 3 have meridian profiles such that these faces can apply themselves regularly against the inner faces of the beads of the tire P.

If H is the height of the tire measured in the equatorial plane of the assembly which is the plane XX' the safety device S being arranged symmetrically with respect to said plane, it is equal to 374 mm for the tire P in question. The total height $H_s$ of the device S, measured in the equatorial plane between the point A of the tread 24 furthest from the axis of rotation and the point O of the face 30 of the ring 3, is equal to 188 mm, that is to say practically equal to 0.5 H in the example described, H, being generally between 0.5 H and 0.6 H.

This height $H_s$ comprises the thickness $e_3$ of the ring 3, equal to 23 mm and therefore to 0.12 $H_s$, which corresponds to a value at most equal to 0.2 $H_s$, the thickness $e_1$ of the support 1, again measured in the equatorial plane XX', equal to 0.67 $H_s$, and therefore between 0.4 $H_s$ and 0.8 $H_s$, and the thickness $e_2$ of the cap 2, equal in the example described to 0.21 $H_s$ and therefore at most equal to 0.5 $H_s$ and preferably between 0.2 $H_s$ and 0.5 $H_s$.

Figure 2:
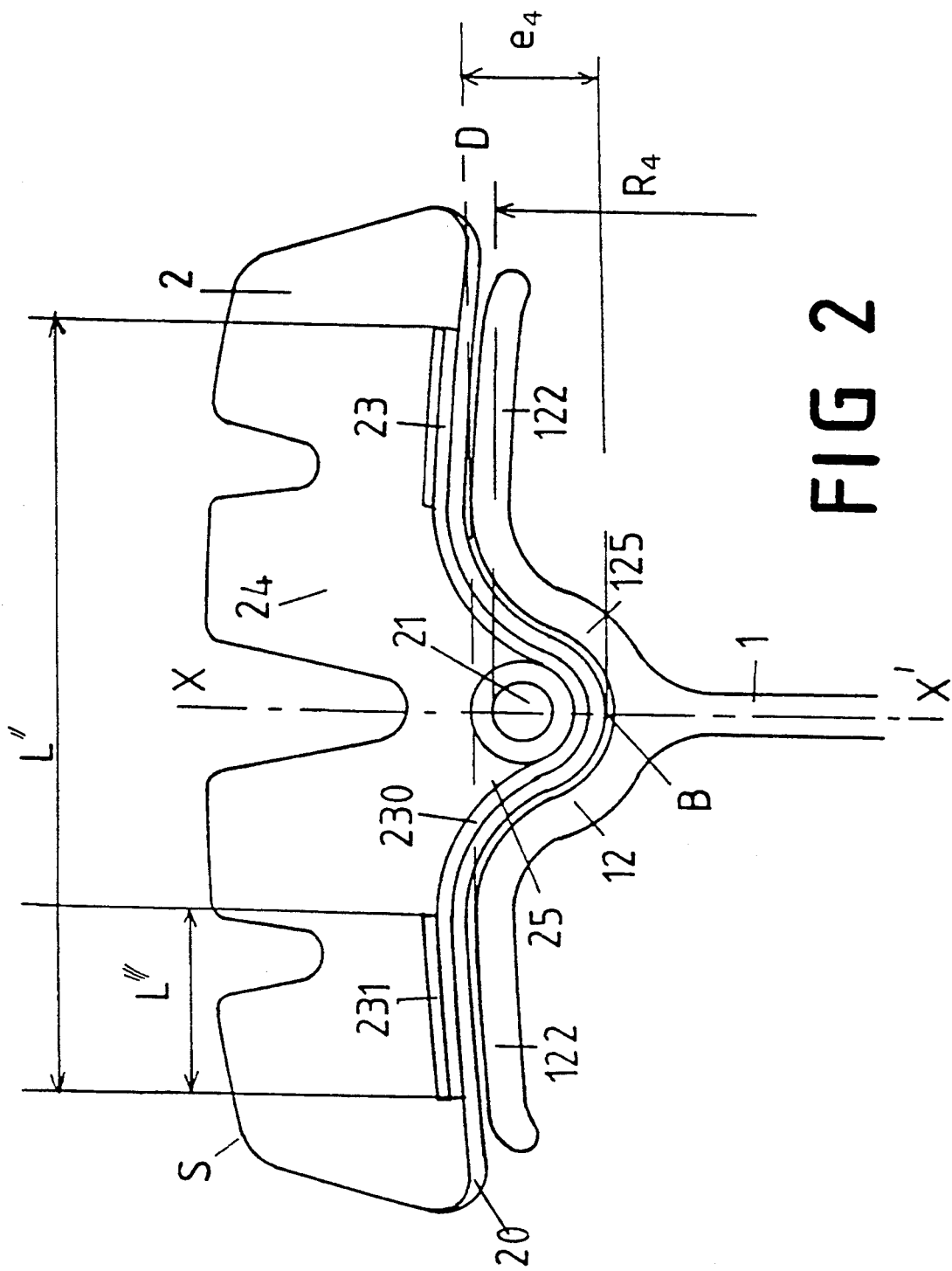
FIG. 2 shows, in meridian section, a second variant of the device in accordance with the invention.

The variant of the safety device shown in FIG. 2 for which the same reference numerals are selected, differs from the example described above by the means for the radial and transverse holding of the cap 2 on the rigid support 1. The bearing ring 12 of the support 1 has at its center a groove 125 which is contained axially between the two shoulders 122 of the bearing ring 12. This groove 125 is intended to receive the circular central rib 25 of the elastic cap 2, which rib is reinforced by a single wire 21 of the same type and structure as the wires 21 used in the device S shown in FIG. 1. The groove 125 has a depth $e_4$, measured in the equatorial plane XX', between its point B closest to the axis of rotation and the imaginary line D connecting the tips of the shoulders 122 furthest from the axis of rotation, such that the outer radius $R_4$ of the reinforcement wire 21 of the rib is less than the radial distance between the imaginary line D from the axis of rotation and the distance $e_4$ being at least equal to 0.25 times the thickness $e_2$ of the cap 2. The cap 2 of FIG. 3 also comprises, in its radially lower portion, a layer of vulcanized mix 20 identical to that of the cap 2 of FIG. 1, a reinforcement armature 23 formed of a ply 230 of radial metal cables of steel, said ply 230 having a width L" substantially equal to the width L of the bearing ring 12 of the support 1 and passing radially below the reinforcement wire 21 and, located on opposite sides of the equatorial plane XX', two narrow plies 231, each formed of metal cables forming with a circumferential direction an angle of between 0° and 5°, the axial width L'" of each of the plies being equal to 0.25 times the axial width L" of the ply 230. A tread 24 provided with circumferential grooves completes the cap 2, having an outer shape identical to the shape of the cap 2 of FIG. 1, in particular with side edges which extend axially beyond the ends of the bearing ring 12.

The mounting of a tire-rim and device assembly such as described above presents no difficulty. The elastic cap 2 is introduced into the tire P, the support 1 is assembled within the cap 2, while the annular part 3 which is meridianly split along a generatrix is placed within the assembled support 1 and the assembly consisting of tire plus safety device is mounted on the rim J.

We claim:

1. A support device for the tread of a tire, comprising at least one rigid support, the radially outer portion of which forms a bearing ring, an elastic cap of vulcanized rubber mix having a thickness which is at least equal to 50% of the total radial height of the device, said elastic cap surrounding the bearing ring, a lubricant product disposed between the bearing ring and the elastic cap, the ring having an axially extending outer surface for the support of the elastic cap, the maximum axial width of the elastic cap being greater than the maximum axial width of the ring, circumferential reinforcement means within the elastic cap, the shape of the radially outer face of the bearing ring of the support cooperating with the shape of the elastic cap radially inwardly of the circumferential reinforcement means to assure the radial holding and circumferential guiding of the elastic cap on the support, and means for mounting the ring on a mounting rim for a tire equipped with the support device.

2. A support device as set forth in claim 1 in which an inner radius of the reinforcing means is less than the maximum outer radius of the outer surface of the ring so that the reinforcing means is at least partially recessed in the outer surface of the ring.

3. A device according to claim 1, characterized by the fact that the bearing ring of the support comprises a ring mid-portion and, axially on opposite sides, two ring shoulders, the radially outer face of the mid-portion of the ring being further from the axis of rotation of the device than the radially outer faces of the shoulders, the shape of the surface defining the shoulders cooperating with the shape of the surface of the elastic cap axially inwardly of reinforcement means to assure radial holding and circumferential guiding of the elastic cap on the support.

4. A device according to claim 3, characterized by the fact that the radial distance between the radially outer face of the mid-portion and the faces of the shoulders is at least equal to 0.25 times the thickness of the cap.

5. A device according to claim 4, characterized by the fact that the reinforcement means in the elastic cap includes, radially on the inside of each of its edges, a wire of braided type coated with a rubber mix, said wire being intended to be arranged axially above the outer face of the shoulder, and the inner radius of said wire is less than the maximum outer radius of the bearing ring of the support.

6. A device according to claim 5, characterized by the fact that the reinforcement means in the elastic cap furthermore includes a reinforcement armature of metal cables of steel, turned up around the wires to form turn-ups.

7. A device according to claim 6, characterized by the fact that the cap comprises a tread provided with at least two circumferential grooves.

8. A device according to claim 1, characterized by the fact that the bearing ring of the support has a center groove located axially between two shoulders, the radial distance between the bottom of the groove and an imaginary line connecting the points of the radially outer faces of the shoulders being at least equal to 0.25 times the thickness of the cap, the center groove cooperating with the shape of the surface of the elastic cap inwardly of the reinforcement means to assure radial holding and circumferential guiding of the elastic cap on the support.

9. A device according to claim 8, characterized by the fact that the cap is provided on its inner face with a circumferential central rib and in which the reinforcement means in the cap includes a single wire the outer radius of which is less than the radial distance between the said imaginary line and the axis of rotation of said device.

10. A device according to claim 9, characterized by the fact that the reinforcing means in the cap furthermore includes a reinforcement armature composed of at least one ply of cords or cables of a width substantially equal to the width of the bearing ring and passing radially below the wire.

11. A device according to claim 10, characterized by the fact that the reinforcement armature also comprises two narrow plies of circumferentially oriented cords or cables arranged symmetrically on both sides of the equatorial plane of the device.

12. A device according to claim 1, characterized by the fact that the means for holding rigid support on the mounting rim of the tire, includes a meridianly split elastic ring comprising, seen in meridian section, a substantially rectangular base over which on its edges there are two lateral ribs.

* * * * *

UNITED STATES PATENT AND TRADEMARK OFFICE
CERTIFICATE OF CORRECTION

PATENT NO. : 5,450,887

DATED : September 19, 1995

INVENTOR(S) : Emmanuel Habay et al.

It is certified that error appears in the above-indentified patent and that said Letters Patent is hereby corrected as shown below:

<u>Column 2, line 25</u>, change "at least" to --at most--;

<u>Column 6, line 5</u>, change "at least" to --at most--.

Signed and Sealed this

Twenty-sixth Day of November 1996

Attest:

BRUCE LEHMAN

*Attesting Officer*     *Commissioner of Patents and Trademarks*